United States Patent
Baur et al.

(10) Patent No.: US 11,951,568 B2
(45) Date of Patent: Apr. 9, 2024

(54) MACHINING PROCESS FOR MICROFLUIDIC AND MICROMECHANICAL DEVICES

(71) Applicant: Femtoprint SA, Muzzano (CH)

(72) Inventors: Charles Baur, St Aubin Sauges (CH); Yves Bellouard, Lutry (CH); Daniele Braga, Lugano-Massagno (CH); Thomas Fussinger, Zûrich (CH); David Lambelet, Neuchâtel (CH); Andrea Lovera, Pregassona (CH); Sacha Pollonghini, Neuchâtel (CH); Arno Rogg, Cupertino, CA (US)

(73) Assignee: Femtoprint SA, Muzzano (CH)

( * ) Notice: Subject to any disclaimer, the term of this patent is extended or adjusted under 35 U.S.C. 154(b) by 700 days.

(21) Appl. No.: 16/767,498

(22) PCT Filed: Nov. 28, 2017

(86) PCT No.: PCT/IB2017/057439
§ 371 (c)(1),
(2) Date: May 27, 2020

(87) PCT Pub. No.: WO2019/106407
PCT Pub. Date: Jun. 6, 2019

(65) Prior Publication Data
US 2020/0353566 A1    Nov. 12, 2020

(51) Int. Cl.
| | |
|---|---|
| *B23K 26/354* | (2014.01) |
| *B23K 26/06* | (2014.01) |
| *B23K 26/0622* | (2014.01) |
| *B23K 26/362* | (2014.01) |
| *B23K 101/36* | (2006.01) |
| *B23K 103/00* | (2006.01) |

(52) U.S. Cl.
CPC ........ *B23K 26/354* (2015.10); *B23K 26/0622* (2015.10); *B23K 26/0648* (2013.01); *B23K 26/362* (2013.01); *B23K 2101/36* (2018.08); *B23K 2103/54* (2018.08); *B23K 2103/56* (2018.08)

(58) Field of Classification Search
CPC ............ B23K 2101/36; B23K 2103/54; B23K 2103/56; B23K 26/0622; B23K 26/0648; B23K 26/354; B23K 26/362; C03C 17/00; C03C 23/0025
USPC ..................................................... 219/121.66
See application file for complete search history.

(56) References Cited

U.S. PATENT DOCUMENTS

| | | | |
|---|---|---|---|
| 8,173,038 B2* | 5/2012 | Wagner | ............... C03C 23/0025 216/97 |
| 2005/0199599 A1* | 9/2005 | Li | ........................ H01L 51/5246 219/121.85 |

FOREIGN PATENT DOCUMENTS

WO    WO-2009/128893 A1    10/2009

OTHER PUBLICATIONS

International Search Report and Written Opinion for PCT/IB2017/057439, dated Apr. 10, 2018, 10 pgs.

* cited by examiner

*Primary Examiner* — Dana Ross
*Assistant Examiner* — Joseph W Iskra
(74) *Attorney, Agent, or Firm* — Blank Rome LLP (57) ABSTRACT

A method for micro-fabricating a device on a substrate (20), comprising the steps of providing a cavity (31) having a temporary aperture (35) communicating with the outside; providing a sealing structure (45) adjacent to a perimeter of the temporary aperture (35); applying heat to the sealing (Continued)

structure (45), whereby the sealing structure melts and seals the temporary aperture (35).

20 Claims, 4 Drawing Sheets

MACHINING PROCESS FOR MICROFLUIDIC AND MICROMECHANICAL DEVICES

RELATED APPLICATION

This application is a national phase of PCT/IB2017/057439, filed on Nov. 28, 2017. The entire content of this application is hereby incorporated by reference.

FIELD OF THE INVENTION

The present invention concerns, in embodiment, a process to fabricate monolithic parts having cavities such as tunnels or sealed volumes that can for instance be used in microfluidic and micromechanical devices, alone as well as in combination with other functionalities so produced. The present invention is especially suitable to the fabrication of three-dimensional micro devices by femtosecond laser exposure, but it is not limited to this application.

DESCRIPTION OF RELATED ART

Microfabrication by ultra-short laser pulses in transparent materials has received much attention over the last two decades. When femtosecond light pulses are focused inside the bulk of a transparent substrate, the local instant power may be brought above the threshold of nonlinear absorption. The bulk of the material can thus be modified and functionalized without affecting its surface properties.

By moving the focal region in the sample or using a plurality of laser beams, it is possible to "write" complex three-dimensional structures in the material. When necessary, the structures written in the substrate by laser pulses can be developed by wet etching or other suitable processes, to dissolve either the exposed or the unexposed regions and obtain a desired arrangement of cavities and channels in the material.

Microfabrication by femtosecond laser pulses is widely used on fused silica or fused quartz, or a variety of glasses like for example aluminosilicate glass, borosilicate glass, soda-lime glass, tellurite glass, chalcogenide glass, or phosphate glass. It has been successfully applied to other transparent materials, like transparent ceramics, glass-ceramics, transparent crystals, organic glasses, and polymers. By choosing a suitable wavelength in the material's transmission band, it can be used also on semiconductors, insulators, and other materials that are not transparent to visible light.

Figures 1, 2, 3:
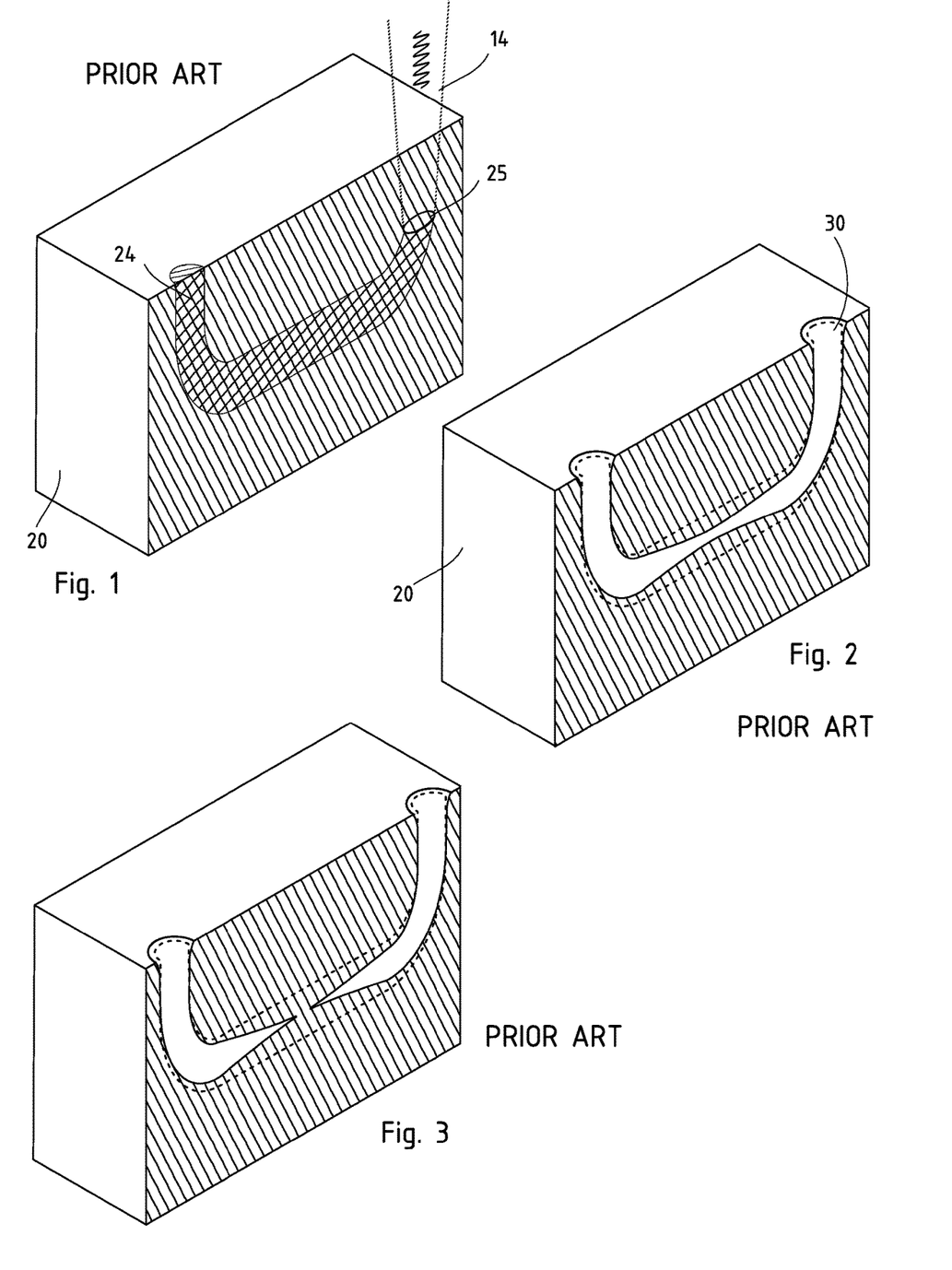
FIGS. 1, 2, and 3 show the fabrication of a buried channel with a femtosecond pulse process.

While the laser pulses can reach any desired point within a reasonable distance from the substrate's surface, the development process to reveal the unexposed regions for instance, relies on the time-dependant diffusion of wet etchants inside the material. When the cavities and channels are very long and present few opening to the outside, this step can be quite long. Moreover, and depending on the etchant selectivity, the etchant may also dissolve part of the unexposed substrate, leading to irregularities and variations of section in long channels. FIGS. 1 to 3 exemplify this limitation of the known methods: a femtosecond laser beam 14 is used to irradiate a substrate in a volume 24 where a buried channel 30 must be realized. Importantly, there is a practical limit in the length of channel that can be produced by HF etching and the other known processes fail to produce small and elongate channels exceeding for example a few millimetres in silica, due to the depletion of the acid that gradually loses his concentration while etching the material.

BRIEF SUMMARY OF THE INVENTION

The invention proposes a method by which temporary opening can be created and then sealed without needing a second sealant material, by providing a temporary opening that has a sealing feature adjacent to its perimeter, preferably protruding above the adjacent surface. Note that this sealing feature could also be protruding within the cavity to be sealed, leaving just a slit on the top. The purpose of the protruding features being to provide an excess of material that while melting, will feed the slit to be closed. When the temporary opening is no longer needed, it can be closed by selectively melting the sealing feature. The method of the invention leads to the creation of tight seams that are integral with the substrate without discontinuities.

The invention is especially useful in a femtosecond laser fabrication process, because one can create temporary openings through which the etching can proceed. Yet, the invention is applicable to other microfabrication processes in which it is desired to create a temporary aperture and seal it, regardless of whether the process includes also an etching step or not, or whether the a laser was used or not.

The invention includes as well devices that have a temporary opening closed by a seam or plug of molten and solidified substrate material that protrudes above the adjacent surface. The plug may have other uses beyond that of sealing a temporary aperture. It could be used for example to create a lens or another refractive element like a light concentrator. The protruding seam or plug could also be used as a marker, for surface roughening, or as a mechanical element, for example to limit the stroke of a sliding element or to guide it.

In another application, the invention is used to tune the mechanical properties of a device. In particular, the invention can be used to alter the rigidity and/or the mass distribution of a mechanical oscillator in order to achieve a desired resonance frequency.

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

FIGS. 1 and 2 relate to a conventional process of femtosecond laser fabrication in which a substrate 20 is exposed to a source of ultrafast light pulses 14 that can be concentrated in a focus region 25 inside the substrate. The focus spot 25 is moved in order to expose the region of materials that need to be eliminated and, after the laser exposure, the part is selectively etched away. Typically, if the substrate is fused silica, the part is etched in in a low concentration HF bath that attacks preferably the exposed region 24.

Although this technique can be used to fabricate open and buried structures, there is a limit to the aspect ratio of the channels that can be generated: the etch bath attacks the unexposed substrate as well as the exposed parts, albeit with a much lower speed, and, since the etchant must necessarily pass through the two extreme openings, the substrate there is exposed considerably more than that in the middle. There is also a limit on how long a channel can be successfully etched through. FIG. 2 shows a channel obtained with a known fabrication method and, in dashed lines, the desired profile; the opening of the resulting channel 39 are broader at the ends, because they have been exposed for a longer time, and from two sides, while the channel is sensibly narrower in the middle due to shorter exposure and dilution of the etchant. As the aspect ratio of the channel increases, so the irregularities worsen until, above a certain length, the channel does not open (FIG. 3).

Figures 4, 5:
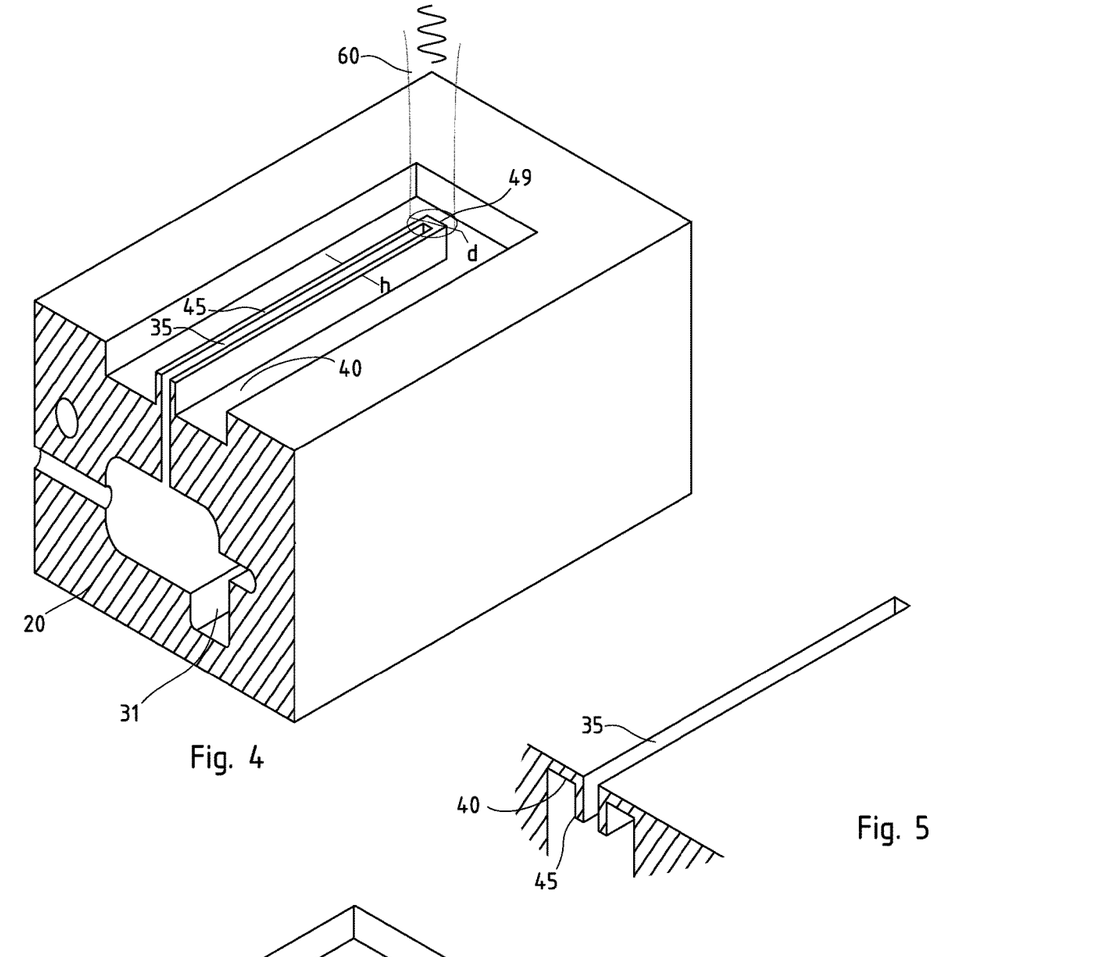
FIG. 4 shows a microfabricated device with a temporary elongated aperture in an intermediate step of fabrication according to an aspect of the invention.
FIG. 5 shows a variant with an inner lip.

FIG. 4 shows a device fabricated by the inventive method, at an intermediate stage. The device comprises a cavity 31 at least partly buried inside a substrate. The cavity can have any shape, no matter how complicated. It could be completely buried below the surface, or have any number of permanent openings (one shown). The function of the cavity is not limited and could encompass:
  fluid transport
  heat pipes in heat exchangers, such as those used in microelectronics
  tune mechanical properties of the substrate in a dynamic or static way
  mechanical actuation through volume change (soft robotics)
  mixing/processing/dispensing of fluids, and/or gas, and/or suspensions
  storing of fluids, and/or gas, and/or suspensions
  guiding/shielding an element such as a cable or an optical fibre
  marking and tracking fiducials
  positioning elements such as V-grooves
  sensing (i.e. mechanical oscillator or flexible beams for accelerators, scales, thermometers, etc.)
the list is not exhaustive According to an important aspect of the invention, the device has a temporary opening 35 that puts the interior of the cavity in communication with the outside. When the fabrication process includes a wet etching step, it is considerably facilitated by the temporary opening 35. In the represented example, the temporary opening 35 is a straight cut above the general longitudinal axis of the cavity 31, but this is not a limiting feature, and the opening 35 may be differently positioned and shaped, and may be curved.

Preferably, the temporary opening 35 has a sealing structure 45 around its perimeter. The sealing structure may encircle the opening completely, as drawn, but some discontinuity would be acceptable. The sealing structure 45 is designed to melt and collapse inward upon application of a localized source of heat, to close the opening with a plug that is perfectly tight and integral with the substrate 20.

Any source of local heat can be used in the frame of the invention, provided it is capable of heating selectively only a target part without raising the temperature of the whole device. Excellent results have been obtained by an infrared laser source, for example a CO2 laser, but the invention is operable also with other localized heat source like for example a miniaturized flame jet, a plasma jet, or an electron beam.

According to an important embodiment, the sealing structure 45 is integral with the substrate 20 and is realized at the same time as the temporary aperture 35 and the cavity 31, for example by ultrafast laser pulses and etching, as mentioned above. This is not an essential feature, however. The invention also comprises variants in which the sealing structure 35 is added after or before these steps. The sealing structure may be then of a different material from the substrate.

The heat source will be chosen in consideration of the melting point of the substrate. The invention is applicable to polycarbonate, acrylic, and other polymeric substrates, which can be easily be melted by a jet of hot gas. More energetic heat sources would likely be required to melt silica, glass, ceramics, or metals.

Preferably, the sealing structure protrudes out of the surrounding surface 40 of the substrate and may form a continuous lip or wall around the perimeter of the temporary opening 35. In this manner, it is only loosely connected thermally with the substrate and can be heated effectively and quickly. The opening 35 is preferably narrow in comparison to the thickness of the wall. Having a protruding sealing structure simplifies selective focusing of the infrared beam, and helps localizing the heat in the sealing structure, sparing the surrounding ones. The invention includes also variants in which the sealing structure is aligned with the upper plane of the device, however.

The inventors have found that it is advantageous to apply the heat initially at a localized spot 49 at one end of the opening 35. The short side of the lip 45 melts creating a drop that pulls the material toward the centre by surface tension. Once the material starts to melt, the heating spot can be moved along the aperture 35 at a suitable speed, and the sidewalls of the sealing structure melt and collapse inward in the manner of a zipper fastener. Starting from a middle point is also possible, but was found to give less consistent results. In many cases, the heating spot is moved from one end of the opening to the opposite one, to close the opening completely. When the application requires it, however, some sections of the opening may be left open.

In an advantageous variant, the transverse size of the hot spot 49 is larger than or comparable to the transverse side of the sealing structure 45, in order to heat it quickly, but not too large to avoid heating the whole device.

In a possible variant, illustrated in FIG. 5, the sealing structure 45 protrudes out of a surrounding inner surface rather than of an outer one. It will be appreciated that at this scale, when the sealing structure reaches the fusion temperature, the surface tension causes the material to coalesce in one plug, regardless of the direction of the force of gravity.

Figure 6:
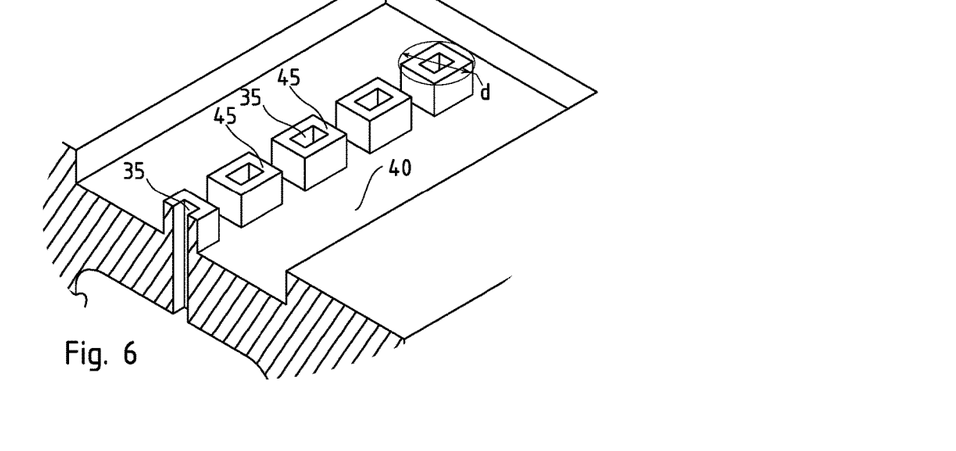
FIG. 6 shows a variant with a plurality of well-like temporary apertures.

In another variant shown in FIG. 6, the temporary openings 35 are in the general shape of a straight well encircled by a wall or lip 45. In this case, they can be molten and sealed one by one by application of heat, preferably in a hot spot whose size is larger than, or comparable to, the well width. Different forms of temporary openings, for example slanted ones, are also possible.

Figure 7:
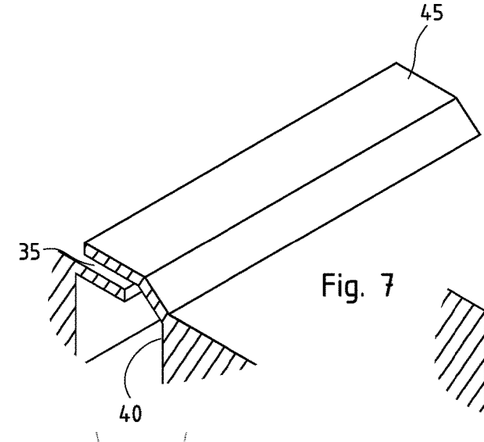
FIG. 7 represents a variant of the invention in which the sealing structure is asymmetric, in an intermediate step of fabrication.

The sealing structure 45 needs not be symmetric and encircle completely the temporary opening 35. In the example shown in FIG. 7, the sealing structure consists in one lip 45 that protrudes above and sideways from one side of the temporary opening 35, and hangs above the other side. When heat is applied locally, the lip 45 melts and fuses with the surface below, sealing the opening 35.

Figure 8:
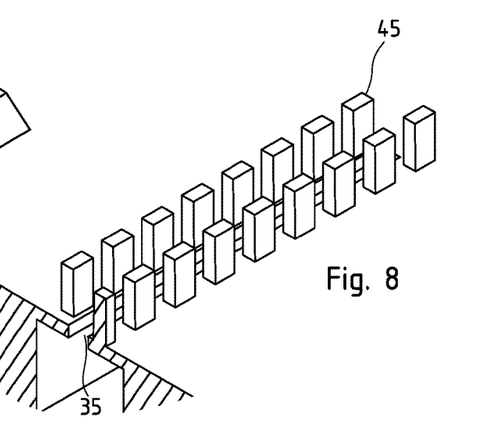
FIG. 8 represents a variant of the invention with a discontinuous sealing structure, in an intermediate step of fabrication.

The sealing structure needs not be continuous either: FIG. 8 shows an example in which the temporary opening 35 is closed by a plurality of discrete plots 45 in a staggered array around the periphery.

Although the figures show straight channels and opening for simplicity's sake, the invention is not so limited. In real use cases, the buried cavity and the temporary opening can have any shape and present any number of interconnected branches.

Figure 9:
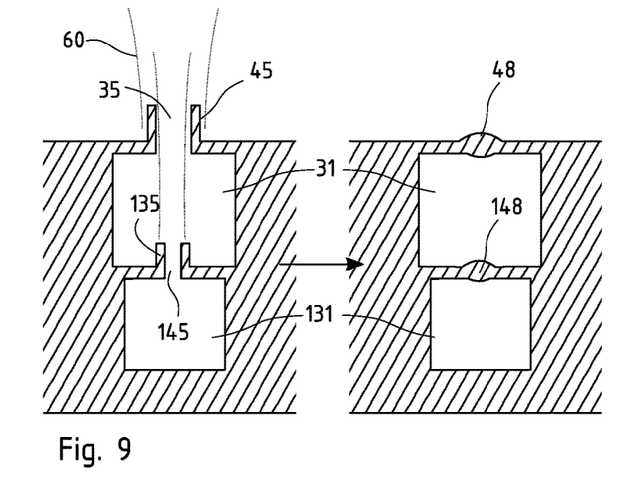
FIG. 9 shows, in section, a device with multilevel buried channels according to an aspect of the invention in two steps of fabrication.

The number of level of buried structures is not limited either. FIG. 9 is an example of a multilevel structure that can be realized with the device of the invention. At the left side is represented the device in an intermediate stage of fabrication, for example after a step of wet etching. It presents two superposed temporary apertures 35 and 135 that realize a communication between the lower cavity 131, the upper cavity 31 and the exterior.

The temporary apertures 35 and 135 are instrumental to the etching step and must be sealed after this is completed. To this purpose, the lower sealing structure can be closed first, by heating it with a laser beam that passes through the upper aperture 35. Preferably, the upper aperture is wider than the lower one.

Once the lower aperture is sealed, the upper aperture 35 can be closed in the same manner, by using a laser beam 60 that is focused in a larger spot. The right hand of FIG. 9 shows a section of the resulting structure with two fused plugs 148 and 149 closing the apertures.

Figure 10:
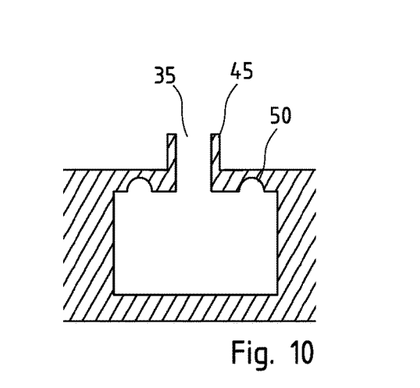
FIG. 10 shows, in section, a device with thermal barriers according to an aspect of the invention, in an intermediate step of fabrication.

In some situations, it may be desirable to introduce heat barriers that limit heat conduction from the sealing structure 45 to the surrounding material. FIG. 10 shows, in section, a variant of the invention in which the sealing structure is surrounded by thermal barriers 50, realized in this embodiment by regions of reduced cross-section.

Several tests have shown that the application of dynamic local heat is effective to seal the structure 45 in fused silica device. The invention is not limited by this feature, however, and the melting may be produced and/or aided by a global heat source acting overall. In some materials, particularly those with higher thermal expansion coefficients than fused silica, a global heating may help in controlling temperature gradients and time profiles of temperature.

Figure 11:
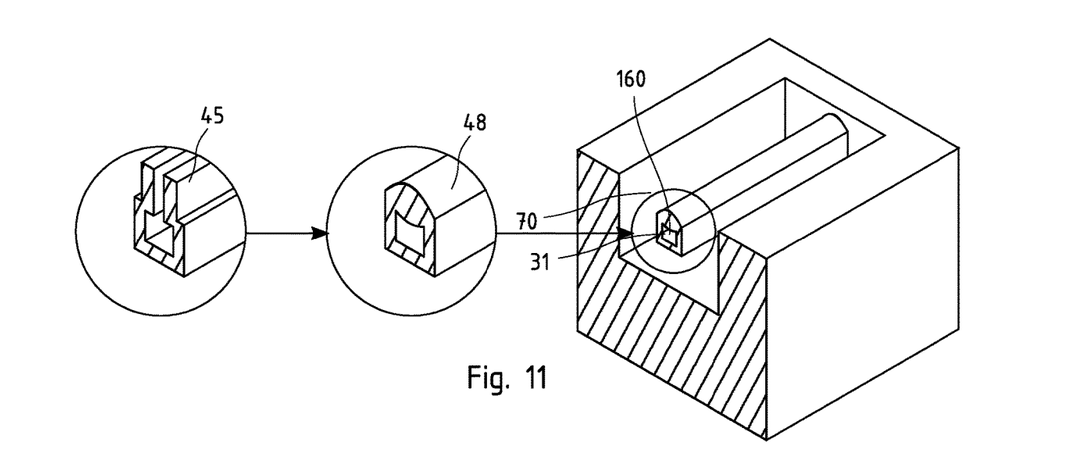
FIG. 11 shows a device with a suspended channel in an intermediate step of fabrication and in a successive step of fabrication.

FIG. 11 shows a possible application of the invention to a microfabricated device that includes a suspended channel 160, the two details on the left showing the channel before and after the sealing of the temporary aperture.

Figure 12:
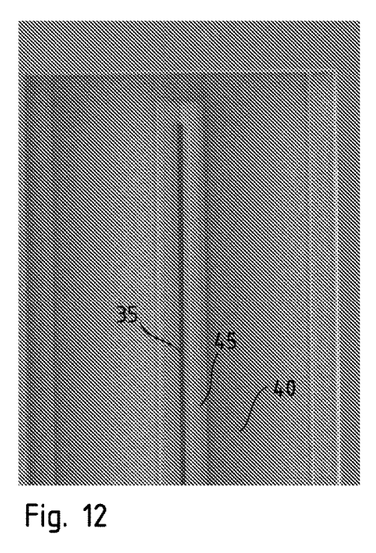
FIG. 12 is a micro photographic reproduction of a device with an elongated temporary aperture in an intermediate step of fabrication.
Figure 14:
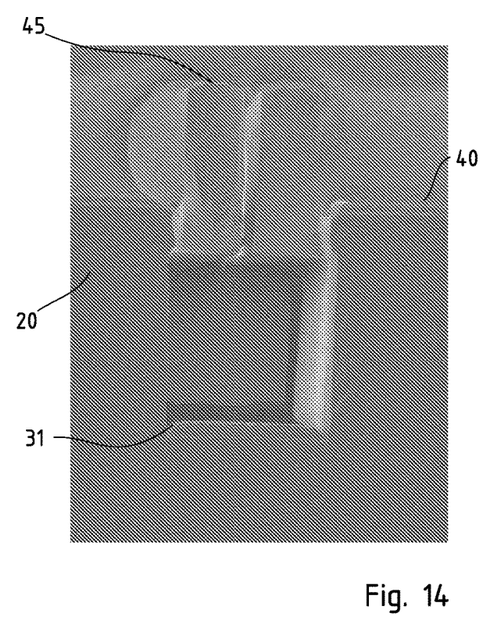
FIG. 14 is a side view of the device of FIG. 12.

FIG. 12 is a micrograph showing a device with a temporary opening in fused silica, before the fusion of the sealing structure. FIG. 14 is a micrograph of the same structure from the side. The structure has been fabricated by a femtosecond laser process. The presence of the temporary opening 35 facilitates the etching and yields a channel 31 of regular shape and constant cross-section.

Figure 13:
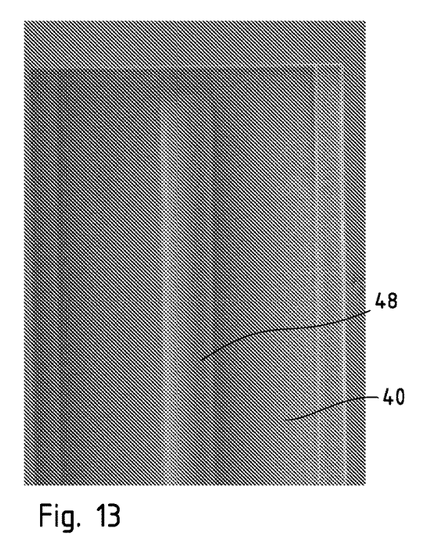
FIG. 13 shows a device in an ulterior step of fabrication after the temporary aperture has been molten and solidified to form a plug.
Figure 15:
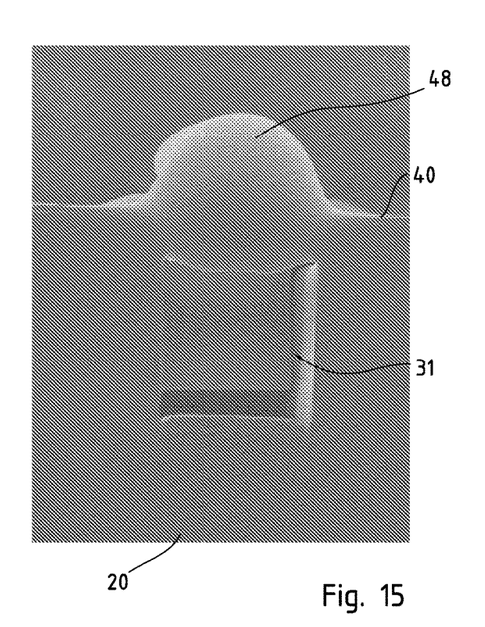
FIG. 15 is a side view of the device of FIG. 13.

FIGS. 13 and 15 show the same device after the sealing of the temporary opening. The sealing structure 45 has collapsed in a plug of solid silica that protrudes out of the adjacent surface 40.

Although the examples have shown the application of the invention to planar structures, mostly, the method is not so limited and can be usefully be employed on substrates of any three-dimensional shape, for example cylindrical or prismatic. One possible application of the invention is the embedding of devices inside optical fibres.

The method applies to a variety of substrates including, but not limited to, all those for which femtosecond laser structuration is available. A non-exhaustive list is:

Fused quartz, fused-silica glass, Soda-lime-silica glass
Borosilicate glass: also known under the trade names: Borcam®, Borosil®, DURAN®, Suprax®, Simax®, BSA 60, BSC 51, Heatex®, Endural®, Boroflaot33®, MemPax®, Refmex®, Kimble®, Pyrex®, BK7, D263, B270
Lead-oxide glass, crystal glass, lead glass
Alkali-free glass: AF32®
Aluminosilicate glass, including products known as Gorilla® glass, Dragontrail®, Xensation®, Eagle-XG®, lotus NXT™
Germanium-oxide glass
tellurite glass
chalcogenide glass
phosphate glass
Titania silicate glass: ULE®
Porous glass
Crystals
Sapphire, Ruby
Diamond
Lithium niobite, calcium fluoride, barium fluoride, Lithium tantalite, Lithium fluoride, Magnesium fluoride, Yttrium Vanadate, Gallium Orthophosphate, Gallium Nitride
Silicon, silicon carbide, Germanium, quartz
ceramics and glass-ceramic comprising Pyroceram®, Ceran®, Eurokera®, Zerodur®, Macor®, Kanger®. Firelite®, Neoceram®, Keralite®, Sitall, CLEARCERAM®-Z, Nexcera®
Photosensitive glass lilke Foturan®, APEX®, . . .
polymers, including organic glasses like polycarbonate glass and acrylic glass,
silicon and other semiconductors in crystalline or polycrystalline form,
crystalline materials like sapphire, mineral glass, crystalline quartz,
metals in crystalline or amorphous form.

In the example shown, the principal function of the plug 48 is that of sealing the underlying cavity, but the plug may have other functions. In particular, the plug could be used as a lens or light concentrator, or as an optical waveguide. The purpose of the plug may be that of providing a bump or ridge that may serve as visible or tactile mark, or have any suitable mechanical function.

Importantly, the property of glasses and other amorphous materials at room temperature are influenced by their thermal history. This is attributed to their different fictive temperature. Experimentally the local fictive temperature of a glass can be measured with a variety of known methods that include differential scanning calorimetry, Raman spectroscopy, and infrared spectroscopy. The methods described above can be used to produce a microfabricated device that has a buried cavity closed by molten plug. The molten plug may be raised out of the surrounding outer surface, and the fictive temperature of the material in the molten plug is different from the fictive temperature of the surrounding material.

REFERENCES TO SYMBOLS IN THE DRAWINGS 14 ultrashort laser pulse
20 substrate
24 exposed volume
25 focal region
30 cavity
31 cavity
35 temporary aperture
40 surface
45 fusible sealing structure
48 molten plug
49 hot spot
50 thermal barrier
60 radiation beam
70 outer cavity
131 lower cavity
135 lower temporary aperture
145 lower sealing structure
148 lower plug
160 suspended channel
d transverse dimension of the radiation beam
h transverse dimension of the sealing structure

The invention claimed is:

1. A method for micro-fabricating a device out of a substrate, comprising the steps of:
   providing a cavity having a temporary aperture communicating with the outside;
   applying heat to a perimeter of the temporary aperture until melting of the substrate and wherein the melted substrate closes the temporary aperture, wherein the application of heat includes directing a beam of radiation or high-velocity particles, for example an infrared beam from a CO2 laser, on the sealing structure, the radiation beam having a transverse width that is smaller than the device and of the cavity and larger than a transverse dimension of the sealing structure or of the temporary aperture.

2. The method of claim 1, wherein the provision of the cavity comprises writing the shape of the cavity into the substrate with a short-pulsed laser having a wavelength to which the substrate is at least in part transparent, followed by etching the cavity through the temporary aperture.

3. The method of claim 1, comprising providing a sealing structure, configured to seal the temporary aperture by melting, adjacent to a perimeter of the temporary aperture, whereby the heat is applied to the sealing structure that is configured to seal melts and seals the temporary aperture.

4. The method of claim 3, wherein the sealing structure protrudes out of an adjacent surface of the substrate.

5. The method of claim 3, wherein the sealing structure protrudes towards the inside of the cavity of the substrate.

6. The method of claim 3, wherein the sealing structure includes a protruding lip encircling the temporary aperture along its perimeter.

7. The method of claim 1, wherein the substrate is one of: fused silica, borosilicate glass, ceramic, soda-lime glass tellurite glass, chalcogenide glass, or phosphate glass, glass-ceramic, crystalline quartz, polycrystalline or crystalline semiconductor, polycrystalline or crystalline insulator, metal, amorphous solid, polymer.

8. The method of claim 1, wherein the sealing structure is of the same material as the substrate.

9. The method of claim 1, wherein the temporary aperture is an elongated slit, the application of heat to the sealing structure begins at one extremity of the slit, and proceeds along the slit, such that the sealing structure melts progressively starting from the extremity.

10. The method of claim 1, wherein the temporary aperture is a well surrounded by the sealing structure, heat being applied to the whole of the sealing structure such that it melts together at the same time.

11. A method for micro-fabricating a device out of a substrate, comprising the steps of:
   providing a cavity having a temporary aperture communicating with the outside, wherein the temporary aperture is an elongated slit;
   applying heat to a perimeter of the temporary aperture until melting of the substrate and wherein the melted substrate closes the temporary aperture;
   wherein the application of heat to the sealing structure begins at one extremity of the slit, and proceeds along the slit, such that the sealing structure melts progressively starting from the extremity.

12. A method of micro-fabricating a device out of a substrate, comprising the steps of:
   providing a cavity having a temporary aperture communicating with the outside;
   applying heat to a perimeter of the temporary aperture until melting of the substrate and wherein the melted substrate closes the temporary aperture,
   wherein the temporary aperture is narrower than the cavity.

13. The method of claim 12, wherein the provision of the cavity comprises writing the shape of the cavity into the substrate with a short-pulsed laser having a wavelength to which the substrate is at least in part transparent, followed by etching the cavity through the temporary aperture.

14. The method of claim 12, comprising providing a sealing structure, configured to seal the temporary aperture by melting, adjacent to a perimeter of the temporary aperture, whereby the heat is applied to the sealing structure that is configured to seal melts and seals the temporary aperture.

15. The method of claim 14, wherein the sealing structure protrudes out of an adjacent surface of the substrate.

16. The method of claim 14, wherein the sealing structure protrudes towards the inside of the cavity of the substrate.

17. The method of claim 14, wherein the sealing structure includes a protruding lip encircling the temporary aperture along its perimeter.

18. The method of claim 12, wherein the substrate is one of: fused silica, borosilicate glass, ceramic, soda-lime glass tellurite glass, chalcogenide glass, or phosphate glass, glass-ceramic, crystalline quartz, polycrystalline or crystalline semiconductor, polycrystalline or crystalline insulator, metal, amorphous solid, polymer.

19. The method of claim 12, wherein the sealing structure is of the same material as the substrate.

20. A method for micro-fabricating a device out of a substrate, comprising the steps of:
   providing a cavity having a temporary aperture communicating with the outside;

applying heat to a perimeter of the temporary aperture until melting of the substrate and wherein the melted substrate closes the temporary aperture; and selectively sealing the sealing structure to tune a mechanical property to a determined value, the mechanical property including a frequency of vibration, inertia moment, flexibility, or stiffness.

\* \* \* \* \*